United States Patent
Liu et al.

(10) Patent No.: US 11,996,800 B2
(45) Date of Patent: May 28, 2024

(54) METHODS AND SYSTEMS FOR DETECTING SHADING FOR SOLAR TRACKERS

(71) Applicant: NEXTracker LLC, Fremont, CA (US)

(72) Inventors: Yang Liu, Mountain View, CA (US); Chen Li, Fremont, CA (US)

(73) Assignee: NEXTRACKER LLC, Fremont, CA (US)

(*) Notice: Subject to any disclaimer, the term of this patent is extended or adjusted under 35 U.S.C. 154(b) by 0 days.

(21) Appl. No.: 17/115,595

(22) Filed: Dec. 8, 2020

(65) Prior Publication Data

US 2021/0091713 A1 Mar. 25, 2021

Related U.S. Application Data

(62) Division of application No. 15/983,718, filed on May 18, 2018, now Pat. No. 10,892,703.

(51) Int. Cl.
*H02S 20/32* (2014.01)
*G01S 3/781* (2006.01)
(Continued)

(52) U.S. Cl.
CPC .............. *H02S 20/32* (2014.12); *G01S 3/781* (2013.01); *G01S 3/782* (2013.01); *G05D 3/105* (2013.01); *G05D 3/20* (2013.01); *G06N 20/00* (2019.01)

(58) Field of Classification Search
CPC .......... H02S 20/32; G01S 3/781; G01S 3/782; G05D 3/105
See application file for complete search history.

(56) References Cited

U.S. PATENT DOCUMENTS 8,421,400 B1 4/2013 Khanna
8,466,399 B1 6/2013 Sherman
(Continued)

FOREIGN PATENT DOCUMENTS

CN 102570906 A 7/2012
CN 106959707 A 7/2017
(Continued)

OTHER PUBLICATIONS

PCT Search Report and Written Opinion issued in PCT Application No. PCT/US19/32993 dated Sep. 20, 2019, 16 pages.
(Continued)

*Primary Examiner* — Kevin K Pyo
(74) *Attorney, Agent, or Firm* — Fredrikson & Byron, P.A.

(57) ABSTRACT

A solar tracker system including a tracker apparatus including a plurality of solar modules, each of the solar modules being spatially configured to face in a normal manner in an on sun position in an incident direction of electromagnetic radiation derived from the sun, wherein the solar modules include a plurality of PV strings, and a tracker controller. The tracker controller includes a processor, a memory, a power supply configured to provide power to the tracker controller, a plurality of power inputs configured to receive a plurality of currents from the plurality of PV strings, a current sensing unit configured to individually monitor the plurality of currents, a DC-DC power converter configured to receive the plurality of power inputs powered from the plurality of PV strings to supply power to the power supply, and a motor controller, wherein the tracker controller is configured to track the sun position.

10 Claims, 5 Drawing Sheets

(51) Int. Cl.
*G01S 3/782* (2006.01)
*G05D 3/10* (2006.01)
*G05D 3/20* (2006.01)
*G06N 20/00* (2019.01)

(56) References Cited

U.S. PATENT DOCUMENTS

| | | | |
|---|---|---|---|
| 9,014,905 | B1 | 4/2015 | Kretzschmar et al. |
| 10,075,125 | B2 | 9/2018 | Liu et al. |
| 2010/0213761 | A1 | 8/2010 | Mcdonald et al. |
| 2011/0056483 | A1 | 3/2011 | Nava |
| 2011/0198935 | A1 | 8/2011 | Hinman et al. |
| 2011/0220091 | A1 | 9/2011 | Kroyzer |
| 2011/0301772 | A1 | 12/2011 | Zuercher et al. |
| 2012/0123720 | A1 | 5/2012 | Fukuba et al. |
| 2013/0166266 | A1 | 6/2013 | Herzig et al. |
| 2014/0167513 | A1 | 6/2014 | Chang et al. |
| 2015/0331972 | A1 | 11/2015 | McClure et al. |
| 2015/0377518 | A1 | 12/2015 | Maxey et al. |
| 2016/0049791 | A1 | 2/2016 | Johnston et al. |
| 2016/0308488 | A1 | 10/2016 | Liu et al. |
| 2017/0070187 | A1 | 3/2017 | Jain et al. |
| 2017/0187192 | A1 | 6/2017 | Jeanty et al. |
| 2017/0288184 | A1 | 10/2017 | Schnakofsky et al. |
| 2018/0030781 | A1 | 2/2018 | Hall et al. |
| 2018/0275314 | A1 | 9/2018 | Pavlovski et al. |
| 2019/0341776 | A1* | 11/2019 | Au .................. H02S 40/38 |

FOREIGN PATENT DOCUMENTS

| | | |
|---|---|---|
| CN | 108011584 A | 5/2018 |
| CN | 108923738 A | 11/2018 |
| WO | 2010003115 A1 | 1/2010 |

OTHER PUBLICATIONS

Office Action issued in U.S. Appl. No. 17/320,999 dated Aug. 3, 2021.
Australian Office Action issued in Australian Patent Application No. 2019270244 dated May 14, 2021, 4 pages.
Final Office Action issued in U.S. Appl. No. 17/320,999 dated Dec. 7, 2021.
First Examination Report issued in Indian Patent Application No. 202017049458 dated Dec. 8, 2021, with English translation, 8 pages.
Notice of Acceptance issued in Australian Patent Application No. 2019270244 dated Dec. 8, 2021, 4 pages.
Advisory Action issued in U.S. Appl. No. 17/320,999 dated Feb. 24, 2022.
Extended European Search Report issued in European Patent Application No. 19803086.8 dated Feb. 16, 2022.
Non-Final Office Action issued in U.S. Appl. No. 17/320,999 dated Jun. 10, 2022.
Examination report No. 1 issued in Australian Patent Application No. 2022201454 dated Feb. 15, 2023.
Notice of Allowance issued in related U.S. Appl. No. 17/320,999 dated Mar. 3, 2023.
Communication under Rule 71(3) EPC issued in European Patent Application No. 19803086.8 dated Apr. 14, 2023.
"Ultra Short Term Prediction Model for Photovoltaic Power Based on Ground Based Cloud Maps", Chen Zhibao, et al., Automation of Electric Power Systems, vol. 37, Issue 19, untranslated, pp. 20-25 Oct. 10, 2013. Submitted with copy of Chinese Office Action for application No. 201980033261.4 dated Sep. 7, 2023 showing relevance of reference.
Extended European Search Report issued in European Patent Application No. 23199808.9 dated Jan. 19, 2024, 6 pgs.

* cited by examiner

METHODS AND SYSTEMS FOR DETECTING SHADING FOR SOLAR TRACKERS

CROSS-REFERENCE TO RELATED APPLICATIONS

This application is a divisional of U.S. patent application Ser. No. 15/983,718 filed May 18, 2018, the entire contents of each of which are incorporated herein by reference.

TECHNICAL FIELD

The present disclosure relates generally to systems and control algorithms for solar panels. More particularly, the present disclosure is directed to solar systems, and more particularly self-powered solar tracking systems and the control systems and algorithms for determining solar module shading.

BACKGROUND

There have been developed a number of solutions power source control in dual and multi-source power systems. In the solar tracker scenario, and particularly the self-powered solar tracker scenario, as described in commonly owned U.S. Patent Publication No. 2016/0308488 filed Dec. 15, 2016, and entitled Self Powered Solar Tracker Apparatus, there have been developed certain control systems. One of these control systems determines the source of the power to be applied to a drive motor which drives the solar tracker, following the sun, in order to ensure that solar panels are positioned for maximum energy production. One source that can be used is the power generated by a solar module. Typically this solar module is specifically assigned only for generation of power to drive the motor. A single panel, even a relatively small panel, is often sufficient to drive the motor, which may only require about 15 W per day (generally between about 10 W and 25 W per day) to drive the solar tracker. In part this very small load is a testament to the balancing of the solar trackers themselves and the high precision engineering which has significantly reduced the mechanical load through balancing and reduction of friction within the system.

Although solar panels have been used successfully for certain applications, there are still limitations. Often, solar panels are unable to convert energy at their full potential due to the fact that the sun is often at an angle that is not optimum for the solar cells to receive solar energy. In the past, various types of conventional solar tracking mechanisms have been developed. Unfortunately, conventional solar tracking techniques are often inadequate. These and other limitations are described throughout the present specification, and may be described in more detail below.

Though there have been developed systems for solar tracking, there is always a need for improved and more efficient systems.

SUMMARY

The present disclosure is directed to a solar tracker system. The solar tracker system includes a tracker apparatus including a plurality of solar modules, each of the solar modules being spatially configured to face in a normal manner in an on sun position in an incident direction of electromagnetic radiation derived from the sun. The solar modules include a plurality of PV strings, and a tracker controller. The tracker controller including a processor, a memory with instructions stored thereon, a power supply configured to provide power to the tracker controller, a plurality of power inputs configured to receive a plurality of currents from the plurality of PV strings, a current sensing unit configured to individually monitor the plurality of currents, a DC-DC power converter configured to receive the plurality of power inputs powered from the plurality of PV strings to supply power to the power supply, and a motor controller, wherein the tracker controller is configured to track the sun position.

In one aspect in accordance with the present disclosure, the tracking includes reading the plurality of currents from the plurality of PV strings and determining, based on the plurality of currents from each PV string, if any portion of the plurality of solar modules are shaded. In another aspect in accordance with the present disclosure, the tracking is based on the determining if any portion of the plurality of solar modules are shaded. In yet another aspect in accordance with the present disclosure, at least one of: a time of year, a geography, and a plurality of sun positions are stored in the memory.

In another aspect in accordance with the present disclosure, the processor executes a learning algorithm to determine what the shading will be for a particular hour on a particular day, based on the stored time of year and the stored plurality of current sun positions. In yet another aspect in accordance with the present disclosure, the controller tracks the sun based on a prediction from the learning algorithm. In a further aspect in accordance with the present disclosure the shading includes south-north shading. In yet a further aspect in accordance with the present disclosure the shading includes east-west shading. Additionally or alternatively, the method may further include determining a priority between a maximum output power and the determining if any portion is shaded.

An aspect of the present disclosure provides a method for solar tracker control. The method includes generating a plurality of currents from a plurality of photo voltaic (PV) strings, communicating the plurality of currents to a tracker controller, measuring the plurality of currents individually, measuring the PV tilt angle, determining, based on the plurality of currents, by using machine learning, if any portion of the PV strings are shaded, wherein the tilt angle of the PV strings are changed based on the determining.

In an aspect in accordance with the present disclosure, a time of year, a geography, and a plurality of sun positions are stored in a memory. In another aspect in accordance with the present disclosure, the determining includes using a machine learning algorithm. In a further aspect in accordance with the present disclosure, the machine learning algorithm uses, as learning data, at least one of the stored time of year, geography, and plurality of sun positions to predict in advance what portion of the PV strings may be shaded. In yet another aspect in accordance with the present disclosure, the controller tracks the sun based on a prediction from the learning algorithm.

In another aspect in accordance with the present disclosure, the tilt angle of the PV strings is further changed based on detecting a maximum output power. Additionally or alternatively, the method may further include determining a priority between a maximum output power and the determining if any portion is shaded. In a further aspect in accordance with the present disclosure the shading includes south-north shading. In yet a further aspect in accordance with the present disclosure the shading includes east-west shading.

BRIEF DESCRIPTION OF THE DRAWINGS

Various aspects of the present disclosure are described herein below with reference to the drawings, which are incorporated in and constitute a part of this specification, wherein.

DETAILED DESCRIPTION

The present disclosure is directed to systems and methods for solar tracker control. Though described generally herein in the context of a solar tracking apparatus that utilizes both a photovoltaic (solar) panel and a battery to provide energy to drive a motor that rotates the tracker assembly, the systems, schematics, and algorithms described herein in any situation where there is solar energy being converted to electrical energy. In particular the systems and algorithms of the present disclosure are useful where there is a solar tracker having a portion of its surface area shaded. A further context for the present disclosure is in the area of a solar farm which is connected to a large power grid and may be associated with large battery banks that can be used to provide power to the grid when the solar panels are unable to meet demand. Commonly owned U.S. Pat. Pub. 2017/0288184 entitled "Standard energy storage container platform," filed Mar. 31, 2017 and teaches a battery container and U.S. patent application Ser. No. 15/872,071 entitled "Direct Current Battery String Aggregator for Standard Energy Storage Enclosure Platform," teaches a controller and system for connecting a battery and photovoltaic system to an energy grid. Both references are incorporated herein by reference.

Figure 1:
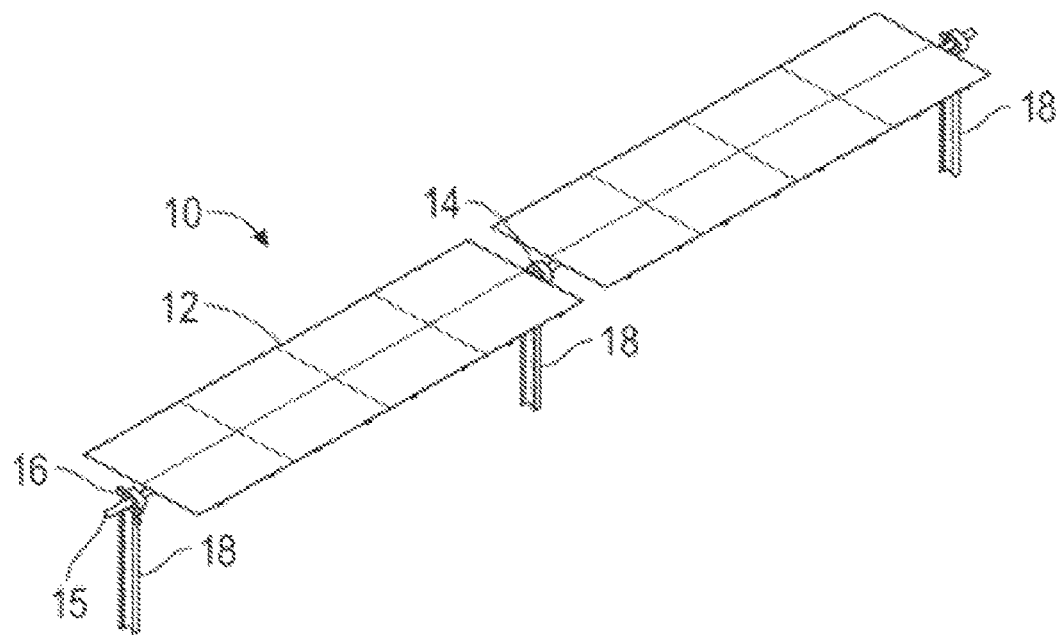
FIG. 1 depicts a solar tracker system in accordance with the present disclosure.

FIG. 1 depicts a solar tracker system 10 which is commonly deployed as part of a larger array. Each tracker 10 includes a plurality of photovoltaic panels 12 (solar panels). A motor 14 drives a shaft 15, to which the solar panels 12 are affixed. By driving the shaft 14, the solar panels 12 are maintained at a proper angle to the sun to ensure maximum electrical power generation. The shaft 15 is suspended between the motor 14 and a swinging or rotating mount 16. Both the motor 14 and the rotating mounts 16 are supported on posts 18.

Figure 2:
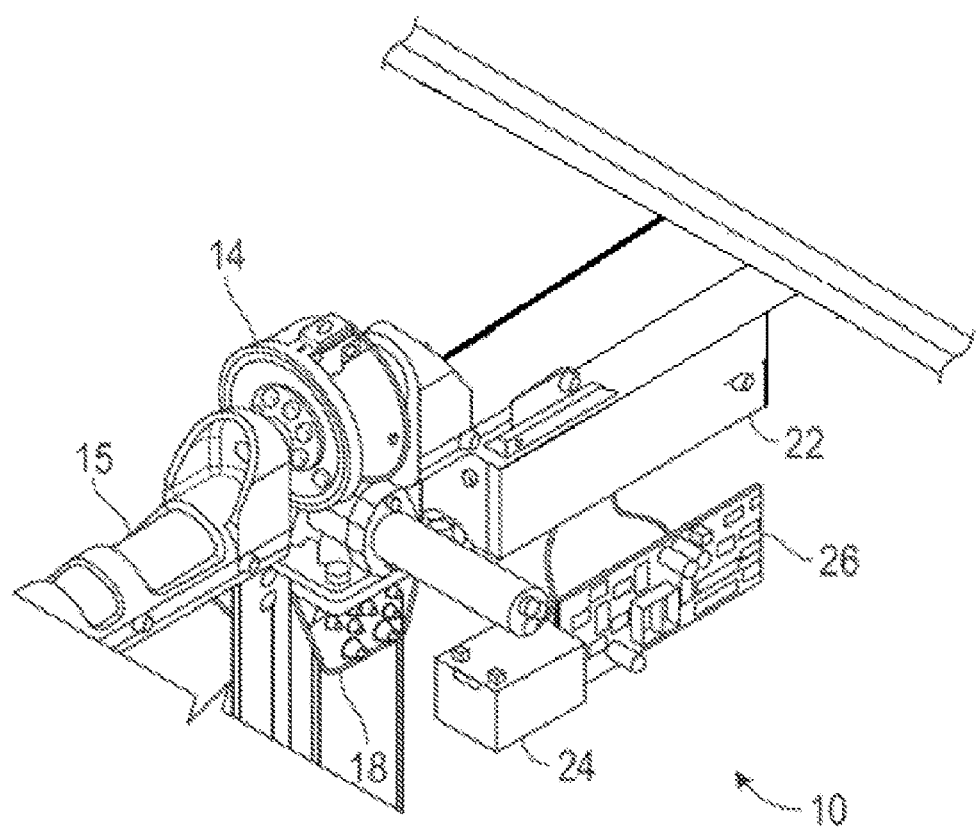
FIG. 2 depicts a detailed view of a drive mechanism of a solar tracker in accordance with the present disclosure.

FIG. 2 depicts the area of the tracker system 10 near the motor 14. The tracker system 10 is located in proximity to the motor 14 and supported by the shaft 15. Either suspended from the underside of the shaft 15 or mounted to the post 18 is a box 22. The box 22 houses a battery 24, for example a lithium ion (Li-ion) battery, and a controller 26. The controller 26 provides input to the motor 14 regarding whether to drive and how far to drive the shaft 15 to enable the panels 12 to track the sun and moves together with the solar panel 12 angle.

Figure 3:
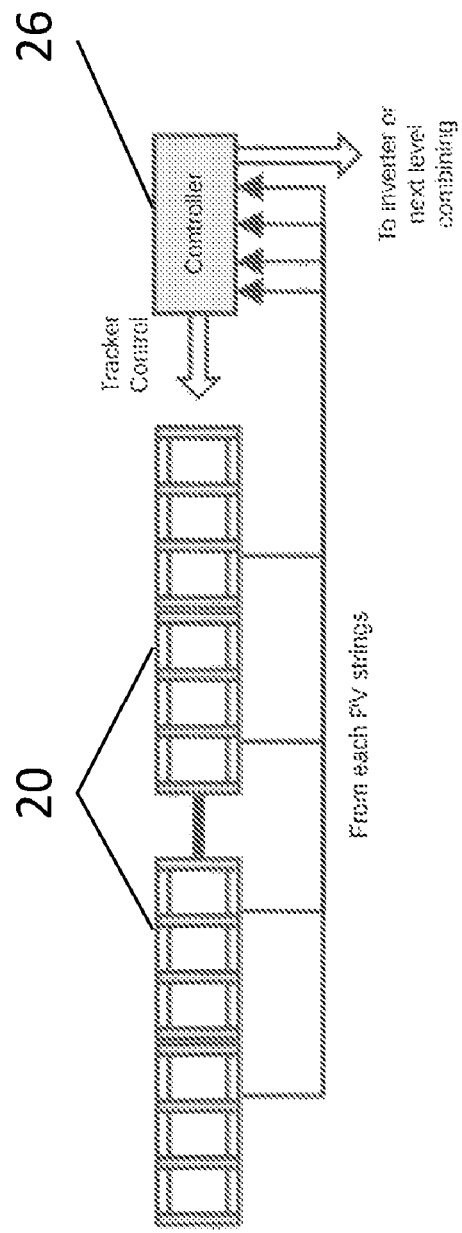
FIG. 3 depicts a schematic of tracker level string combining and monitoring in accordance with the present disclosure.

FIG. 3 depicts a schematic of tracker level string combining and monitoring in accordance with the present disclosure. In a larger PV array, individual solar panels 12 of FIG. 1, are connected in series (e.g., positive to negative). This series connection of solar panels 12 is called a PV string 20. Power is communicated electrically from each string 20 individually to the controller 26. Thus, individual currents of each of the PV strings 20 can be monitored. For example, this monitoring may also be used for over-current protection, solar panel 12 maintenance, for a tracking algorithm to increase PV plant yield, and/or detection of south-north shading in addition to east-west shading. The controller 26 may then output the sum of the power as a single pair of DC cable to an inverter or to next level combining.

Figure 4:
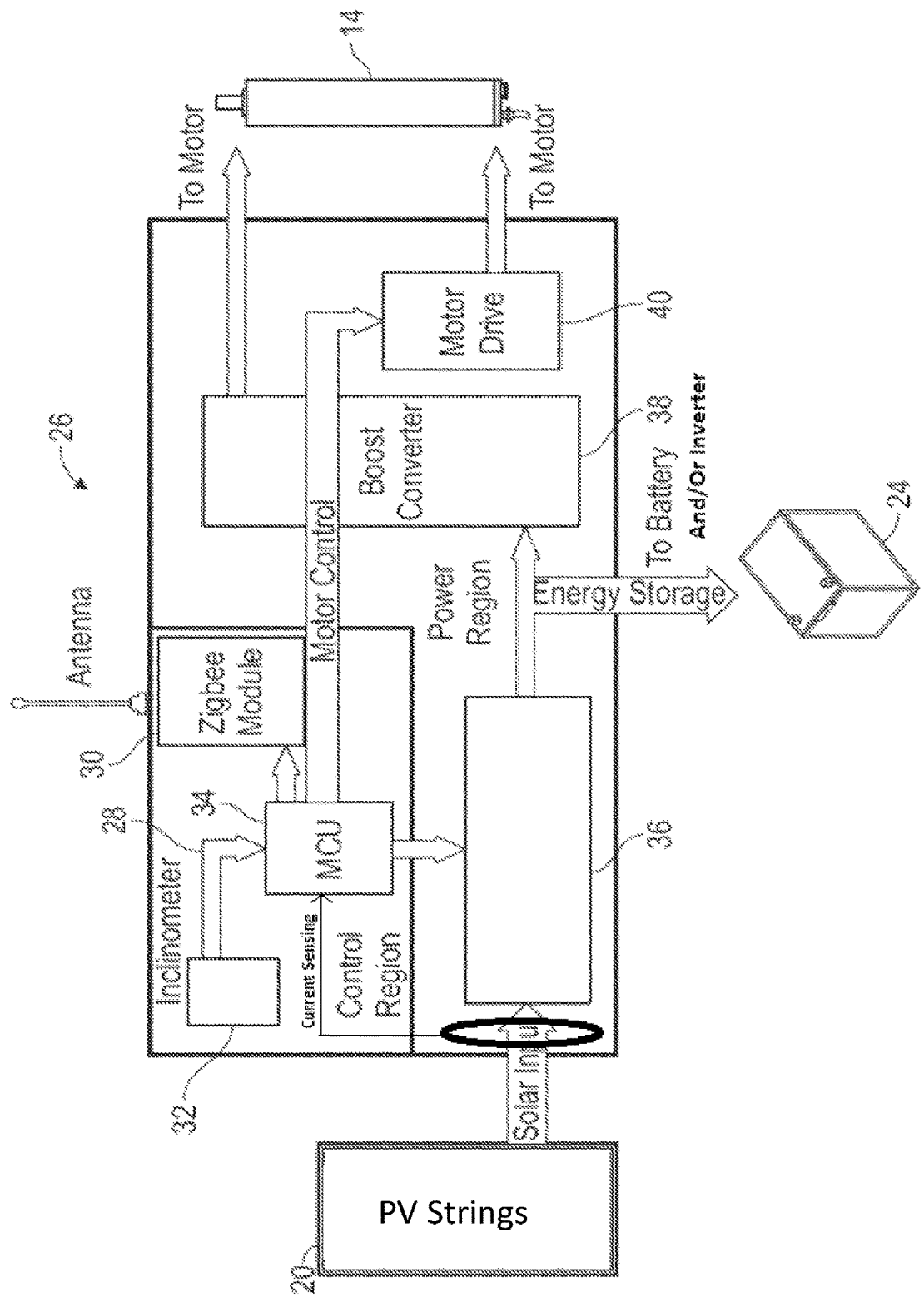
FIG. 4 depicts a schematic of a control system for a solar tracker in accordance with the present disclosure.
Figure 5:
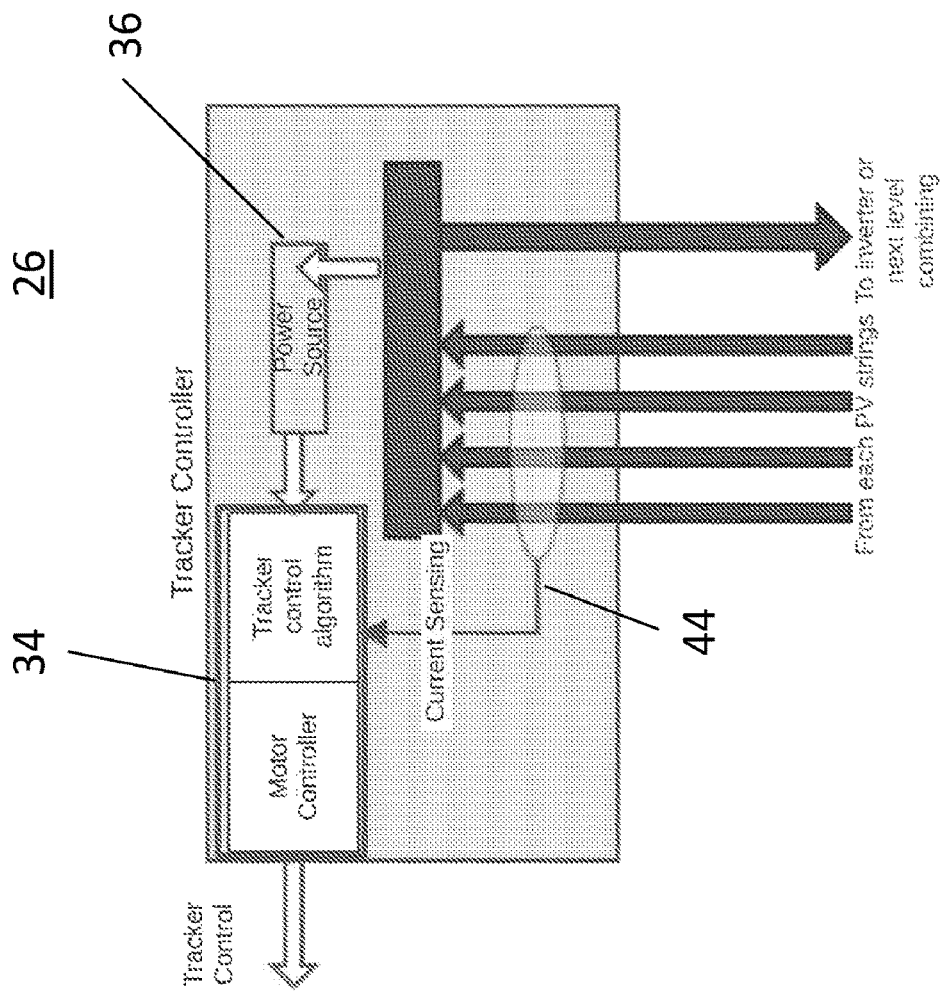
FIG. 5 depicts a schematic of a tracker controller for a solar tracker in accordance with the present disclosure.

An example of the controller 26 can be seen in FIG. 4 and FIG. 5. The controller 26 includes a control region 28 which houses a communications module 30 (e.g., Zigbee, Wi-fi, Bluetooth®, etc.), an inclinometer 32, and a main controller (MCU) 34. The main controller 34 communicates with a power supply 36, which provides power to the controller 26, and with a motor drive controller 40, which controls the driving of the motor 14. As depicted in FIG. 4, the PV strings 20 provide electricity to the power supply 36, which at the discretion of the main controller 34 is either directed to the battery 24 for charging, to a boost converter 38 for application to the motor 14 to actually cause the motor 14 to be driven, and/or to an inverter. The main controller 34 can also determine, based on the input from the PV strings 20, whether the energy being supplied is insufficient to drive the motor 14, and can cause the stored energy in the batter 24 to be utilized for this purpose. The power from each of the individual PV strings 20 is detected by a current sensing circuit 44. The current sensing circuit 44 measures the individual currents of each PV string 20. This measured current is fed into the MCU 34 which can run a tracker control algorithm for optimizing the power created by the tracker system 10.

Figure 6:
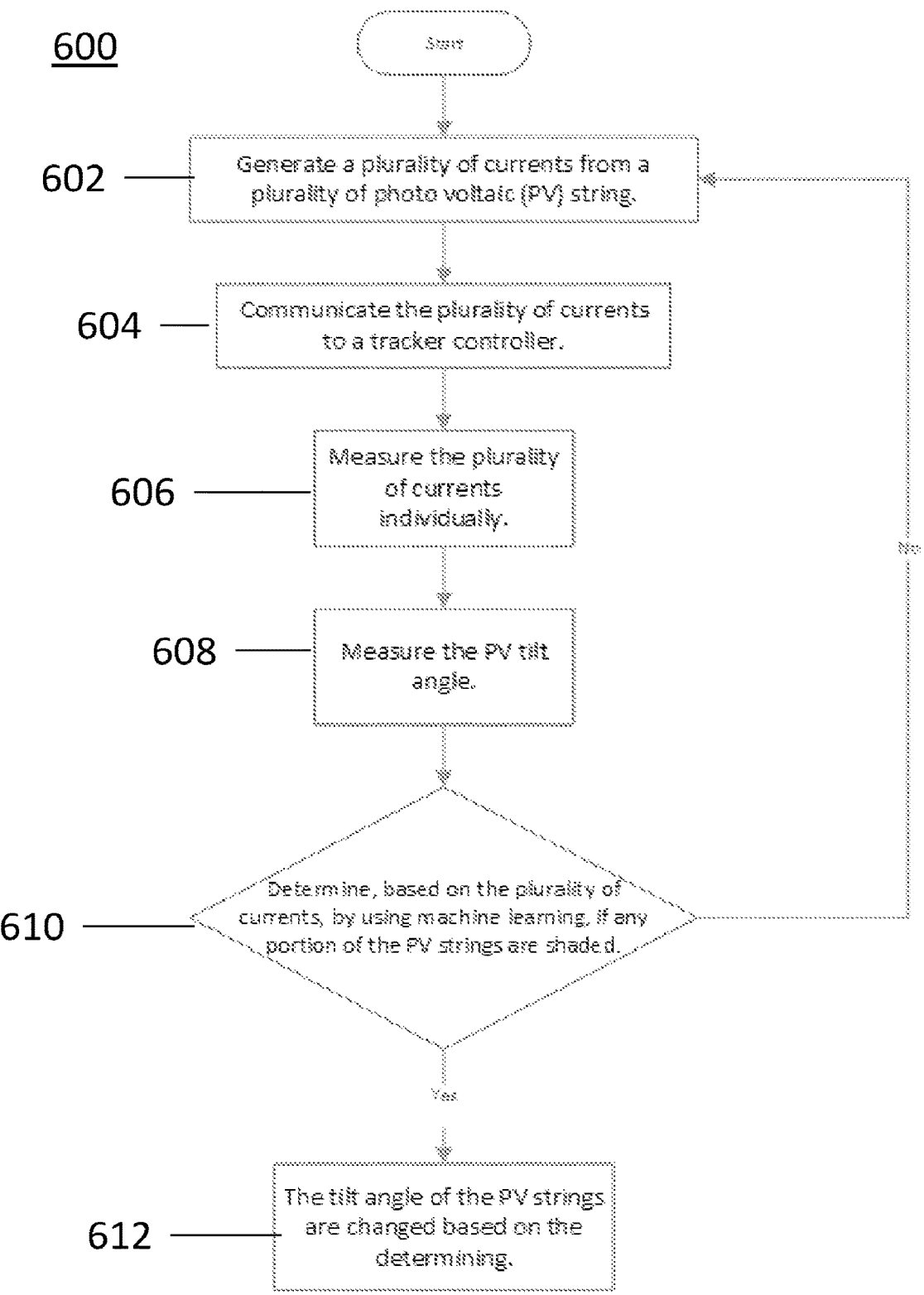
FIG. 6 depicts a logic flow for a control algorithm in accordance with the present disclosure.

FIG. 6 depicts a logic flow for a control algorithm 600 in accordance with the present disclosure. In one embodiment, each of the PV strings 20 generates a current. (Block 602) Each of the individual PV string 20 currents are communicated to the MCU 34. (Block 604) The MCU 34 utilizes the current sensing circuit of FIG. 5. to measure the plurality of the currents individually. (Block 606) An inclinometer 32 detects and measures the PV tilt angle and communicates this angle to the MCU 34. (Block 608) The MCU 34 may use a machine learning algorithm to determine based on the plurality of currents, if any portion of the PV strings are shaded. (Block 610) The monitoring of each PV string 20 current will allow the MCU 34 to detect both south-north shading in addition to east-west shading.

For training inputs, the machine language algorithm may use, for example, the geographical location of the solar tracker system 10, the typical sun location in the sky and strength for that time of day for that day of the year, and typical weather for that location and time of year. The machine learning algorithm can anticipate for that solar tracker system 10 installation, for that geography, for that time of year what the shading will likely be. The term "machine learning" may include, but is not limited to, neural networks, naive Bayes, nearest neighbors, least squares, means, and support vector regression, among other data science and artificial science techniques. Depending on what portion of the PV strings were determined to be shaded, the tilt angle of the PV strings are changed by commanding the motor drive 40 of FIG. 4 to actuate the motor 14. (Block 612) Thus allowing the MCU 34 to detect if any portion was shaded and change tracking accordingly. The MCU 34 can also determine if any of the PV strings 20 has a failure and disable that PV string 20.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

We claim:

1. A method for solar tracker control comprising:
    providing a plurality of solar modules, each solar module configured to receive electromagnetic radiation from a sun, the plurality of solar modules arranged to form a plurality of photovoltaic (PV) strings, each PV string comprising at least two solar modules;
    generating a plurality of currents from the plurality of PV strings of a solar tracker;
    communicating the plurality of currents to a tracker controller of the solar tracker;
    measuring a current associated with each PV string;
    measuring a tilt angle associated with each PV string;
    determining that a portion of the plurality of PV strings is shaded based on one or more of the measured currents being less than a threshold; and
    changing the tilt angle of one or more of the plurality of PV strings in response to determining that a portion of the plurality of PV strings is shaded.

2. The method of claim 1 further comprising a learning algorithm configured to predict a position of the sun, the learning algorithm trained by training data and the measured currents from the plurality of PV strings, the training data comprising at least one of a time of year, a geography, and a plurality of sun positions stored in a memory, yielding a stored time of year, geography, and plurality of sun positions.

3. The method of claim 2, wherein the determining includes using the learning algorithm, and wherein the learning algorithm comprises a machine learning algorithm.

4. The method of claim 3, wherein the machine learning algorithm uses, as learning data, at least one of the stored time of year, geography, and plurality of sun positions to predict in advance what portion of the plurality of PV strings may be shaded.

5. The method of claim 4, wherein the tracker controller tracks the Sun based on a prediction from the machine learning algorithm.

6. The method of claim 1, wherein the tilt angle of one or more of the plurality of PV strings is further changed based on detecting a maximum output power.

7. The method of claim 1, further comprising determining a priority between a maximum output power and the determining if any portion is shaded.

8. The method of claim 1, wherein the shading includes south-north shading.

9. The method of claim 1, wherein the shading includes east-west shading.

10. The method of claim 1, wherein the shading includes south-north shading and east-west shading.

* * * * *